United States Patent [19]
Hagersten et al.

[11] Patent Number: 5,860,109
[45] Date of Patent: Jan. 12, 1999

[54] METHODS AND APPARATUS FOR A COHERENCE TRANSFORMER FOR CONNECTING COMPUTER SYSTEM COHERENCE DOMAINS

[75] Inventors: Erik E. Hagersten, Palo Alto, Calif.; Mark Donald Hill; David A. Wood, both of Madison, Wis.

[73] Assignee: Sun Microsystems, Inc., Palo Alto, Calif.

[21] Appl. No.: 677,015

[22] Filed: Jul. 1, 1996

[51] Int. Cl.$^6$ .................................................. G06F 12/00
[52] U.S. Cl. ........................... 711/141; 711/210; 711/147; 711/146; 711/151
[58] Field of Search .................... 395/280, 800, 395/473, 200.08, 471

[56] References Cited

U.S. PATENT DOCUMENTS

| | | | |
|---|---|---|---|
| 5,182,801 | 1/1993 | Asfour | 395/425 |
| 5,283,886 | 2/1994 | Nishii et al. | 395/425 |
| 5,303,362 | 4/1994 | Butts, Jr. et al. | 395/425 |
| 5,522,045 | 5/1996 | Sandberg | 395/200.04 |
| 5,522,058 | 5/1996 | Iwasa et al. | 395/472 |
| 5,588,131 | 12/1996 | Borrill | 395/473 |
| 5,590,308 | 12/1996 | Shih | 395/463 |
| 5,634,110 | 5/1997 | Laudon et al. | 395/472 |
| 5,644,753 | 7/1997 | Ebrahim et al. | 395/458 |

FOREIGN PATENT DOCUMENTS 0392657  10/1990  European Pat. Off. .

OTHER PUBLICATIONS

Lovett, et al., "Sting: A CC–NUMA Computer Iystem for the Commercial Marketplace", Sequent Computer Sytems, Inc., 15450 SW Koll Parkway, Beaverton, Oregon 97006, XP 000592195, ISCA '96 May 1996 PA, USA.

Iwasa, et al., "SSM–MP: More Scalability in Shared–Memory MultiProcessor", Information and Communication Systems Laboratory, Toshiba Corporation, 2–9 Suehiro–cho Ome–shi Tokyo 198 Japan, 1995 IEEE.

Lenoski, et al., "The Stanford Dash Multiprocessor", 25 (1992) Mar., No. 3, Los Alamitos, CA US.

Krafka, et al., "An Empirical Evaluation of Two Memory–Efficient Directory Methods", Department of Electrical Engineering and Computer Sciences, University of California, Berkeley, 1990 IEEE.

*Primary Examiner*—Tod R. Swann
*Assistant Examiner*—Fred Fei Tzeng
*Attorney, Agent, or Firm*—Beyer & Weaver, LLP

[57] ABSTRACT

An apparatus for facilitating the sharing of memory blocks, which has local physical addresses at a computer node, between the computer node and an external device. The apparatus includes snooping logic configured for coupling with a common bus of the computer node. The snooping logic is configured to monitor, when coupled to the common bus, memory access requests on the common bus. There is also included a snoop tag array coupled to the snooping logic. The snoop tag array includes tags for tracking all copies of a first plurality of memory blocks of the memory blocks cached by the external device. Further, there is included a protocol transformer logic coupled to the snooping logic for enabling the apparatus, when coupled to the external device, to communicate with the external device using a protocol suitable for communicating with the external device.

26 Claims, 7 Drawing Sheets

| State | Representing | Meaning |
|---|---|---|
| I | Invalid | CT does not have copy |
| S | Shared | CT owns a shared copy |
| E | Exclusive | CT owns an exclusive (potentially modified) copy |

Fig. 6

| Bus to CT | Current State | CT to X | X to CT | CT to Bus | Bus to Ct | New State | Comment |
|---|---|---|---|---|---|---|---|
| RTO | I | | | | | I | Ignore |
| | S | XINV | XINV_ack | RTO<br>RTO_data | RTO_data | | |
| | E | XRTO | XRTO_data | RTO_data | | | |
| RTS | I | | | RTS<br>RTS_data | | | Ignore |
| | S | | | RTS_data | RTS_data | S | |
| | E | XRTS | XRTS_data | RTS_data | | | |
| WB | I | | | | | | Ignore |
| | S or E | | | | | | Error |

FIG. 7

| X to CT | Current State | Allocate Tag? | CT to Bus | Bus to CT | CT to X | X to CT | New State | Comments |
|---|---|---|---|---|---|---|---|---|
| XRTO | I | Yes, Unallocate another tag? | RTO | RTO_data |  |  | E |  |
|  | S | No | RTO | RTO_data | XRTO_data |  | E |  |
|  | E |  |  |  | XRTO_data |  |  | Error |
| XRTS | I | Yes, Unallocate another tag? | RTS | RTS_data | XRTS_data |  | S |  |
|  | S | No | RTS | RTS_data | XRTS_data |  | S |  |
|  | E |  |  |  |  |  |  | Error |
| XWB | I or S |  |  |  |  |  |  | Error |
|  | E | No | WB WB_data |  |  | XWB_data | I |  |

Fig. 8

METHODS AND APPARATUS FOR A COHERENCE TRANSFORMER FOR CONNECTING COMPUTER SYSTEM COHERENCE DOMAINS

CROSS REFERENCE TO RELATED PATENT APPLICATIONS

This patent application is related to the following copending, commonly assigned patent applications, the disclosures of which are incorporated herein by reference in their entirety:

1. "Extending The Coherence Domain Beyond A Computer System Bus" by Hagersten et al., filed concurrently herewith. (Reference Number P990)
2. "Method And Apparatus Optimizing Global Data Replies In A Computer System" by Hagersten, filed concurrently herewith. (Reference Number P991)
3. "Method And Apparatus Providing Short Latency Round-Robin Arbitration For Access To A Shared Resource" by Hagersten et al., filed concurrently herewith. (Reference Number P992)
4. "Implementing Snooping On A Split-Transaction Computer System Bus" by Singhal et al., filed concurrently herewith. (Reference Number P993)
5. "Split Transaction Snooping Bus Protocol" by Singhal et al., filed concurrently herewith. (Reference Number P989)
6. "Interconnection Subsystem For A Multiprocessor Computer System With A Small Number Of Processors Using A Switching Arrangement Of Limited Degree" by Heller et al., filed concurrently herewith. (Reference Number P1609)
7. "System And Method For Performing Deadlock Free Message Transfer In Cyclic Multi-Hop Digital Computer Network" by Wade et al., filed concurrently herewith. (Reference Number P1572)
8. "Synchronization System And Method For Plesiochronous Signaling" by Cassiday et al., filed concurrently herewith. (Reference Number P1593)
9. "Methods And Apparatus For A Coherence Transformer For Connecting Computer System Coherence Domains" by Hagersten et al., filed concurrently herewith. (Reference Number P1519)
10. "Methods And Apparatus For A Coherence Transformer With Limited Memory For Connecting Computer System Coherence Domains" by Hagersten et al., filed concurrently herewith. (Reference Number P1530)
11. "Methods And Apparatus For Sharing Stored Data Objects In A Computer System" by Hagersten et al., filed concurrently herewith. (Reference Number P1463)
12. "Methods And Apparatus For A Directory-Less Memory Access Protocol In A Distributed Shared Memory Computer System" by Hagersten et al., filed concurrently herewith. (Reference Number P1531)
13. "Hybrid Memory Access Protocol In A Distributed Shared Memory Computer System" by Hagersten et al., filed concurrently herewith. (Reference Number P1550)
14. "Methods And Apparatus For Substantially Memory-Less Coherence Transformer For Connecting Computer System Coherence Domains" by Hagersten et al., filed concurrently herewith. (Reference Number P1529)
15. "A Multiprocessing System including An Enhanced Blocking Mechanism For Read To Share Transactions In A NUMA Mode" by Hagersten, filed concurrently herewith. (Reference Number P1786)
16. "Encoding Method For Directory State In Cache Coherent Distributed Shared Memory Systems" by Guzovskiy et al., filed concurrently herewith. (Reference Number P1520)
17. "Software Use Of Address Translation Mechanism" by Nesheim et al., filed concurrently herewith. (Reference Number P1560)
18. "Directory-Based, Shared-Memory, Scaleable Multiprocessor Computer System Having Deadlock-free Transaction Flow Sans Flow Control Protocol" by Lowenstein et al., filed concurrently herewith. (Reference Number P1561)
19. "Maintaining A Sequential Stored Order (SSO) In A Non-SSO Machine" by Nesheim, filed concurrently herewith. (Reference Number P1562)
20. "Node To Node Interrupt Mechanism In A Multiprocessor System" by Wong-Chan, filed concurrently herewith. (Reference Number P1587)
21. "Deterministic Distributed Multicache Coherence Protocol" by Hagersten et al., filed Apr. 8, 1996, Ser. No. 08/630,703.
22. "A Hybrid NUMA Coma Caching System And Methods For Selecting Between The Caching Modes" by Hagersten et al., filed Dec. 22, 1995, Ser. No. 08/577,283.
23. "A Hybrid NUMA Coma Caching System And Methods For Selecting Between The Caching Modes" by Wood et al., filed Dec. 22, 1995, Ser. No. 08/575,787.
24. "Flushing Of Attraction Memory In A Computer System" by Hagersten et al., filed concurrently herewith. (Reference Number P1416)
25. "Efficient Allocation Of Cache Memory Space In A Computer
25. "Efficient Allocation Of Cache Memory Space In A Computer System" by Hagersten et al., filed concurrently herewith. (Reference Number P1576)
26. "Efficient Selection Of Memory Storage Modes In A Computer System" by Hagersten et al., filed concurrently herewith. Reference Number P1726)
27. "Skip-level Write-through In A Multi-level Memory Of A Computer System" by Hagersten et al., filed concurrently herewith. (Reference Number P1736)
28. "A Multiprocessing System Configured to Perform Efficient Write Operations" by Hagersten, filed concurrently herewith. (Reference Number P1500)
29. "A Multiprocessing System Configured to Perform Efficient Block Copy Operations" by Hagersten, filed concurrently herewith. (Reference Number P1515)
30. "A Multiprocessing System Including An Apparatus For Optimizing Spin-Lock Operations" by Hagersten, filed concurrently herewith. (Reference Number P1525)
31. "A Multiprocessing System Configured to Detect and Efficiently Provide for Migratory Data Access Patterns" by Hagersten et al., filed concurrently herewith. (Reference Number P1555)
32. "A Multiprocessing System Configured to Store Coherency State within Multiple Subnodes of a Processing Node" by Hagersten, filed concurrently herewith. (Reference Number P1527)
33. "A Multiprocessing System Configured to Perform Prefetching Operations" by Hagersten et al., filed concurrently herewith. (Reference Number P1571)
34. "A Multiprocessing System Configured to Perform Synchronization Operations" by Hagersten et al., filed concurrently herewith. (Reference Number P1551)
35. "A Multiprocessing System Having Coherency-Related Error Logging Capabilities" by Hagersten et al., filed concurrently herewith. (Reference Number P1719)
36. "Multiprocessing System Employing A Three-Hop Communication Protocol" by Hagersten, filed concurrently herewith. (Reference Number P1785)
37. "A Multiprocessing System Configured to Perform Software Initiated Prefetch Operations" by Hagersten, filed concurrently herewith. (Reference Number P1787)

38. "A Multiprocessing Computer System Employing Local and Global Address Spaces and Multiple Access Modes" by Hagersten, filed concurrently herewith. (Reference Number P1784)

39. "Multiprocessing System Employing A Coherency Protocol Including A Reply Count" by Hagersten et al., filed concurrently herewith. (Reference Number P1570)

BACKGROUND OF THE INVENTION

The present invention relates to a method and an apparatus for sharing memory among coherence domains of computer systems. More specifically, the invention relates to a novel method and apparatus for efficiently solving coherence problems when memory blocks having local physical addresses (LPA) in a particular computer node of a computer system are shared by other nodes of the system as well as by external entities coupled to that computer node.

The sharing of memory among multiple coherence domains presents unique coherence problems. To facilitate a discussion of these coherence problems, FIG. 1 shows a computer node 100 representing, e.g., a computer node in a more complex computer system. Within computer node 100, there are shown a plurality of processing nodes 102, 104, and 106 coupled to a common bus 108. Each of processing nodes 102, 104, and 106 represents, for example, a discrete processing unit that may include, e.g., a processor and its own memory cache. The number of processing nodes provided per computer node 100 may vary depending on needs, and may include any arbitrary number although only three are shown herein for simplicity of illustration.

Within computer node 100, a common bus 108 is shown coupled to a memory module 110, which represents the memory space of computer node 100 and may be implemented using a conventional type of memory such as dynamic random access memory (DRAM). Memory module 110 is typically organized into a plurality of uniquely addressable memory blocks 112. Each memory block of memory module 110, e.g., memory block 112(a) or memory block 112(b), has a local physical address (LPA) within computer node 100, i.e., its unique address maps into the memory space of computer 100. Each memory block 112 represents a storage unit for storing data, and each may be shared among processing nodes 102, 104, and 106 via common bus 108. Of course, there may be provided as many memory blocks as desired to satisfy the storage needs of computer node 100. In some cases, many memory modules 110 may be provided by computer node 100.

As is known to those skilled in the art, computer processors, e.g., processor 116 within processing node 102, typically operates at a faster speed than the speed of the memory module 110. To expedite access to the memory blocks 112 of memory module 110, there is usually provided with each processing node, e.g., processing node 102, a memory cache 114. A memory cache, e.g., memory cache 114, takes advantage of the fact that a processor, e.g., processor 116, is more likely to reference memory addresses that it recently references than other random memory locations. Further, memory cache 114 typically employs faster memory and tends to be small, which further contributes to speedy operation.

Within memory cache 114, there exists a plurality of block frames 118 for storing copies of memory blocks, e.g., memory blocks 112. Each block frame 118 has an address portion 120 for storing the address of the memory block it cached. If the unique address of memory block 112(a) is, e.g., FF5h, this address would be stored in address portion 120 of a block frame 118 when memory block 112(a) of memory module 110 is cached into memory cache 114. There is also provided in block frame 118 a data portion 122 for storing the data value of the cached memory block. For example, if the value stored in memory block 112(a) was 12 when memory block 112(a) was cached into block frame 118, this value 12 would be stored in data portion 122 of block frame 118.

Also provided in block frame 118 is a status tag 124 for storing the state of the memory block it cached. Examples of such states are, e.g., E, S, and I, representing respectively exclusive, shared, and invalid. The meanings of these states are discussed in greater detail herein.

A processing node may hold an exclusive copy of a memory block in its cache when it is the only entity having a valid copy. Such exclusive copy may potentially be different from its counterpart in memory module 110, e.g., it may have been modified by the processing node that cached it. Alternatively, a processing node may possess a shared, read-only copy of a memory block. When one processing node, e.g., processing node 102, caches a shared copy of a memory block, e.g., memory block 112(a), other processing nodes, e.g., processing nodes 104 and 106, may also possess shared copies of the same memory block.

If a memory block is never cached in a processing node or it was once cached but is no longer cached therein, that processing node is said to have an invalid copy of the memory block. No valid data is contained in the block frame when the state associated with that block frame is invalid.

The coherence problem that may arise when memory block 112 is shared among the processing nodes of FIG. 1 will now be discussed in detail. Assuming that processing node 102 caches a copy of memory block 112(a) into its memory cache 114 to change the value stored in memory block 112 from 12 to 13. Typically, when the value is changed by a processing node such as processing node 102, that value is not updated back into memory module 110 immediately. Rather, the updating is typically performed when memory cache 114 of processing node 102 writes back the copy of memory block 112(a) it had earlier cached.

Now suppose that before memory cache 114 has a chance to write back the changed value of memory block 112(a), i.e., 13, into memory module 110, processing node 104 wishes to reference memory block 112(a). Processing node 104 would first ascertain in its own memory cache 132 to determine whether a copy of memory block 112(a) had been cached therein earlier. Assuming that a copy of memory block 112(a) has never been cached by processing node 104, a cache miss would occur.

Upon experiencing the cache miss, processing node 104 may then proceed to obtain a copy of memory block 112(a) from memory module 110. Since the changed value of memory block 112(a) has not been written back into memory module 110 by processing node 102, the old value stored in memory block 112(a), i.e., 12, would be acquired by processing node 104. This problem is referred to herein as the coherence problem and has the potential to provide erroneous values to processing nodes and other devices that share a common memory.

Up to now, the sharing of memory blocks 112 is illustrated only with reference to devices internal to computer node 100, i.e., devices such as processing nodes 102, 104, and 106 that are designed to be coupled to common bus 108 and communicate thereto employing the same communication protocol. There may be times when it is necessary to couple computer node 100 to other external devices, e.g., to facilitate the expansion of the computer system. Oftentimes, the external devices may employ a different protocol from that employed on common bus 108 of computer node 100 and may even operate at a different speed.

External device 140 of FIG. 1 represents such an external device. For discussion purposes, external device 140 may represent, for example, an I/O device such as a gateway to a network. Alternatively, external device 140 may be, for example, a processor such as a Pentium Pro™ microprocessor (available from Intel. Corp. of Santa Clara, Calif.), representing a processor whose protocol and operating speed may differ from those on common bus 108. As a further example, external device 140 may represent a distributed shared memory agent for coupling computer node 100 to other entities having their own memory spaces, e.g., other computer nodes having their own memory modules. Via the distributed shared memory agent, the memory blocks within computer node 100 as well as within those other memory-space-containing entities may be shared.

Although an external device may need to share the data stored in memory module 110, it is typically not possible to couple an external device, such as external device 140, directly to common bus 108 to allow external device 140 to share the memory blocks in memory module 110. The direct coupling is not possible due to, among others, the aforementioned differences in protocols and operating speeds.

In view of the foregoing, what is needed is an improved method and apparatus for permitting memory blocks having a local physical address (LPA) in a particular computer node to be shared, in an efficient and error-free manner, among interconnected entities such as other processing nodes and external devices.

SUMMARY OF THE INVENTION

The invention relates, in one embodiment, to a method in a computer system having a computer node which has a common bus, for permitting an external device that is external to the computer node to share memory blocks having local physical addresses in a memory module at the computer node. The invention advantageously permits the sharing irrespective whether the external device and the common bus both employ a common protocol and irrespective whether the external device and the common bus both operate at the same speed. The method includes the step of obtaining, through a coherence transformer coupled to the common bus, a first copy of a first memory block having a local physical address in the memory module on behalf of the external device.

The obtain step includes the step of receiving, using the coherence transformer, a first memory access request for the first memory block from the external device. There is further included the step of acquiring, using the coherence transformer, the first copy of the first memory block from the common bus. Additionally, there is included the step of tracking, using a tag of a snoop tag array associated with the coherence transformer, a state of the first copy of the first memory block at the external device, the state includes one of an exclusive, a shared, and an invalid states. Further, there is the step of sending the first copy of the first memory block from the coherence transformer to the external device.

In another embodiment, the invention relates to a method for sharing memory blocks having local physical addresses in a memory module at a computer node between the computer node and an external device in a computer system. The sharing is facilitated through a coherence transformer coupled between the external device and a common bus of the computer node. The coherence transformer has snooping logic for monitoring memory access requests on the common bus and a snoop tag array for tracking all memory blocks cached by the external device.

The method includes the step of receiving, using the coherence transformer, a first memory access request pertaining to a first memory block of the memory blocks. The first memory access request is issued by the external device. The method further includes the step of servicing, using the coherence transformer, the first memory access request by obtaining on behalf of the external device the first memory block from the common bus of the computer node, thereby insulating the computer node from any protocol difference between a first protocol employed by the external device and a second protocol employed on the common bus.

In yet another embodiment, the invention relates to an apparatus for facilitating the sharing of memory blocks, which has local physical addresses at a computer node, between the computer node and an external device. The apparatus includes snooping logic configured for coupling with a common bus of the computer node. The snooping logic is configured to monitor, when coupled to the common bus, memory access requests on the common bus. There is also included a snoop tag array coupled to the snooping logic. The snoop tag array includes tags for tracking all copies of a first plurality of memory blocks of the memory blocks cached by the external device. Further, there is included a protocol transformer logic coupled to the snooping logic for permitting the apparatus, when coupled to the external device, to communicate with the external device using a protocol suitable for communicating with the external device.

These and other advantages of the present invention will become apparent upon reading the following detailed descriptions and studying the various figures of the drawings.

BRIEF DESCRIPTION OF THE DRAWINGS

FIG. 6 shows, in one embodiment of the present invention, the various available states that may be stored in the state fields of the tags in the tag array.

Fig.7 illustrates, in one embodiment of the present invention, selected transactions performed by the coherence transformer in response to memory access requests on the common bus.

FIG. 8 illustrates, in one embodiment of the present invention, selected transactions performed by the coherence transformer in response to memory access requests from one of the external devices.

DETAILED DESCRIPTION OF THE PREFERRED EMBODIMENTS

An invention is described for permitting memory blocks having local physical addresses (LPA) in a particular computer node to be shared, in an efficient and error-free manner, among interconnected entities such as other computer systems and external devices. In the following description, numerous specific details are set forth in order to provide a thorough understanding of the present invention. It will be obvious, however, to one skilled in the art, that the present invention may be practiced without some or all of these specific details. In other instances, well known structures and process steps have not been described in detail in order not to unnecessarily obscure the present invention.

In accordance with one aspect of the present invention, there is provided a coherence transformer for coupling a computer node, e.g., computer node 100, to an external device. The coherence transformer permits an external device, which may employ a different protocol from that employed by computer node 100 and may even operate at a different speed, to access memory blocks having local physical addresses at computer node 100. In one aspect of the present invention, the coherence transformer tracks the memory blocks cached by the external device. The coherence transformer then monitors memory access requests on the bus of computer node 100. If one of the memory access requests on the bus of computer node 100 pertains to a memory block currently cached by an external device, the coherence transformer can intervene to provide the latest copy of that memory block, thereby avoiding a coherence problem.

Figure 2:
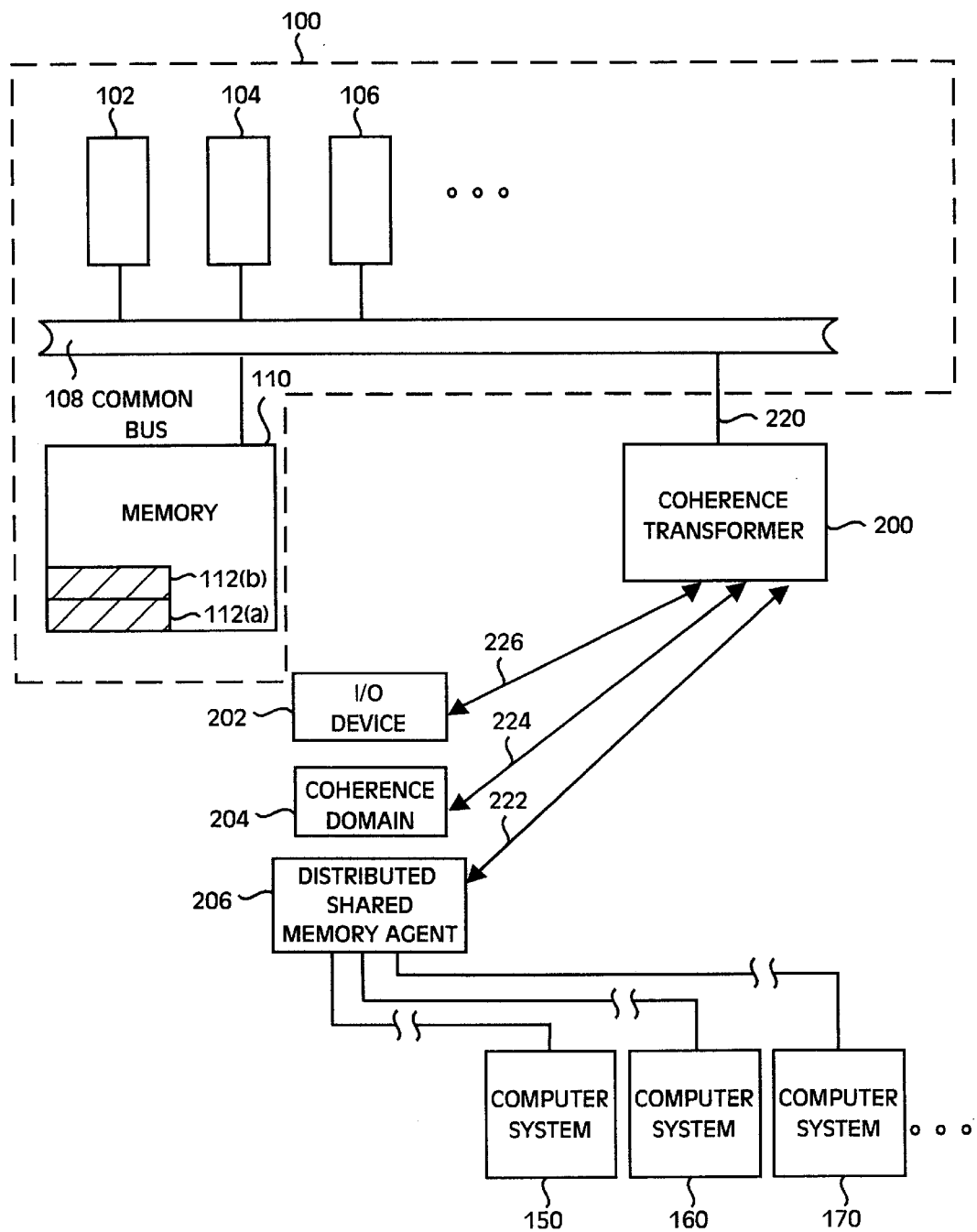
FIG. 2 shows, in accordance with one aspect of the present invention, a coherence transformer block.

The operational details of the coherence transformer may be better understood with reference to the drawings that follow. Referring now to FIG. 2, there is provided, in accordance with one aspect of the present invention, a coherence transformer 200 for coupling computer node 100 to one of a plurality of external devices 202, 204, and 206. Note that although only one of each type of external device (202, 204, or 206) is shown for ease of illustration, there may in fact exist many external devices of each type coupled to coherence transformer 200. Via coherence transformer 200, the contents of the memory blocks of memory module 110, e.g., memory blocks 112, may be accessed by any of external devices 202, 204, and 206. In accordance with one aspect of the present invention, memory blocks of memory module 110 may be shared by the external devices although these external devices employ protocols and operate at speeds different from those on common bus 108 of computer node 100.

External device 202 may represent, for example, an I/O device such as a gateway to a computer network that may obtain a few memory blocks 112 at a time from memory module 110 via coherence transformer 200. External device 204 may represent, for example, a coherence domain such as a processor, whose internal protocol and operating speed may differ from that running on common bus 108. Examples of differences include differences in block sizes and signaling. External device 206 may represent, for example, a distributed shared memory agent device.

Distributed shared memory agent device 206 may include logic circuitry for connecting computer node 100 to other distributed shared memory (DSM) domains such as other computer nodes to facilitate the sharing of memory blocks among different DSM domains and with computer node 100. Further, distributed shared memory agent device 206 may permit a processing node 102 in computer node 100 to access both memory block 112 within its local memory module 110 as well as memory blocks associated with memory modules within computer nodes 150, 160, and 170, and vice versa. The use of distributed shared memory agent 206 creates the illusion that there is a centralized shared memory resource that the processors within computer nodes 100, 150, 160, and 170 may access although this centralized memory resource is physically implemented and distributed among different computer nodes.

Coherence transformer 200 may communicate with common bus 108 of computer node 100 via a coherence transformer link 220. On the external domain, coherence transformer 200 may communicate with any of the external devices, e.g., any of external devices 202, 204, and 206, via links 222, 224, and 226 using a protocol that is appropriate for the external device with which it communicates.

Figure 3:
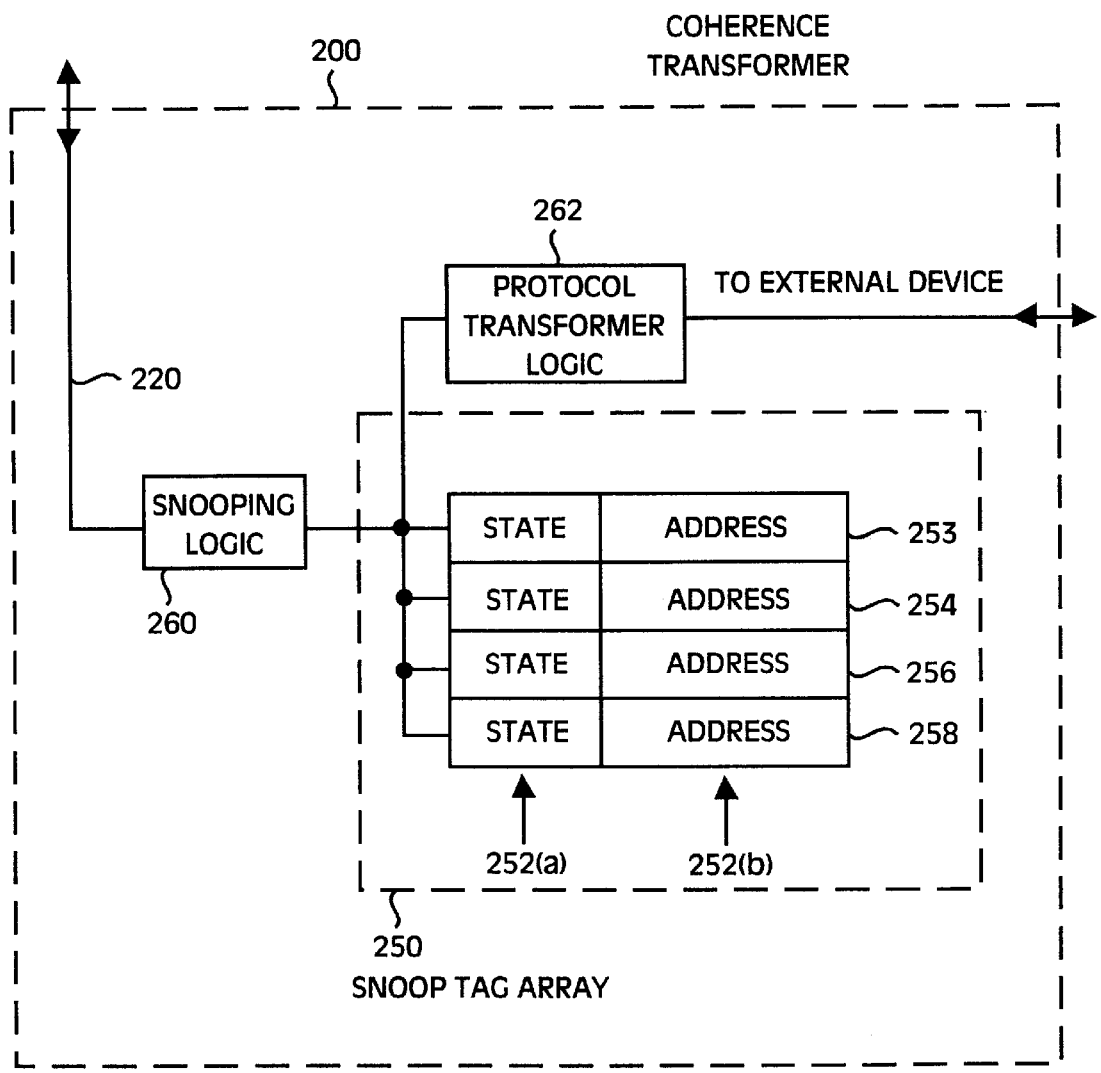
FIG. 3 shows, in accordance with one aspect of the present invention, a tag array within the coherence transformer of FIG. 2.

Referring now to FIG. 3, there is shown, in one embodiment, the functional units within coherence transformer 200. In one embodiment, the functional units are implemented as digital logic circuits. As can be appreciated by those skilled in the art, however, these functional units may be implemented either in hardware (digital or analog) or in software, depending on needs. Within coherence transformer 200, there is shown a snoop tag array 250, representing the mechanism for keeping track of the memory blocks accessed by a device on the external side, e.g., one of external devices 202, 204, and 206. Within snoop tag array 250, there is shown a plurality of tags 253, 254, 256, and 258. In one embodiment, there may be as many tags in snoop tag array 250 as there are memory blocks cached externally. As will be discussed in greater detail later, the provision of a tag for every memory block externally cached minimizes any impact on the bandwidth of common bus 108 when a memory block in memory module 110 is externally cached, i.e., cached by one of the external devices. Of course, the number of tags in snoop tag array 250 may vary depending on needs and may represent any arbitrary number. In another embodiment, however, the number of tags may be fixed and the available tags are recycled, with some impact on the bandwidth of common bus 108, to track any number of externally cached memory blocks.

Figure 1:
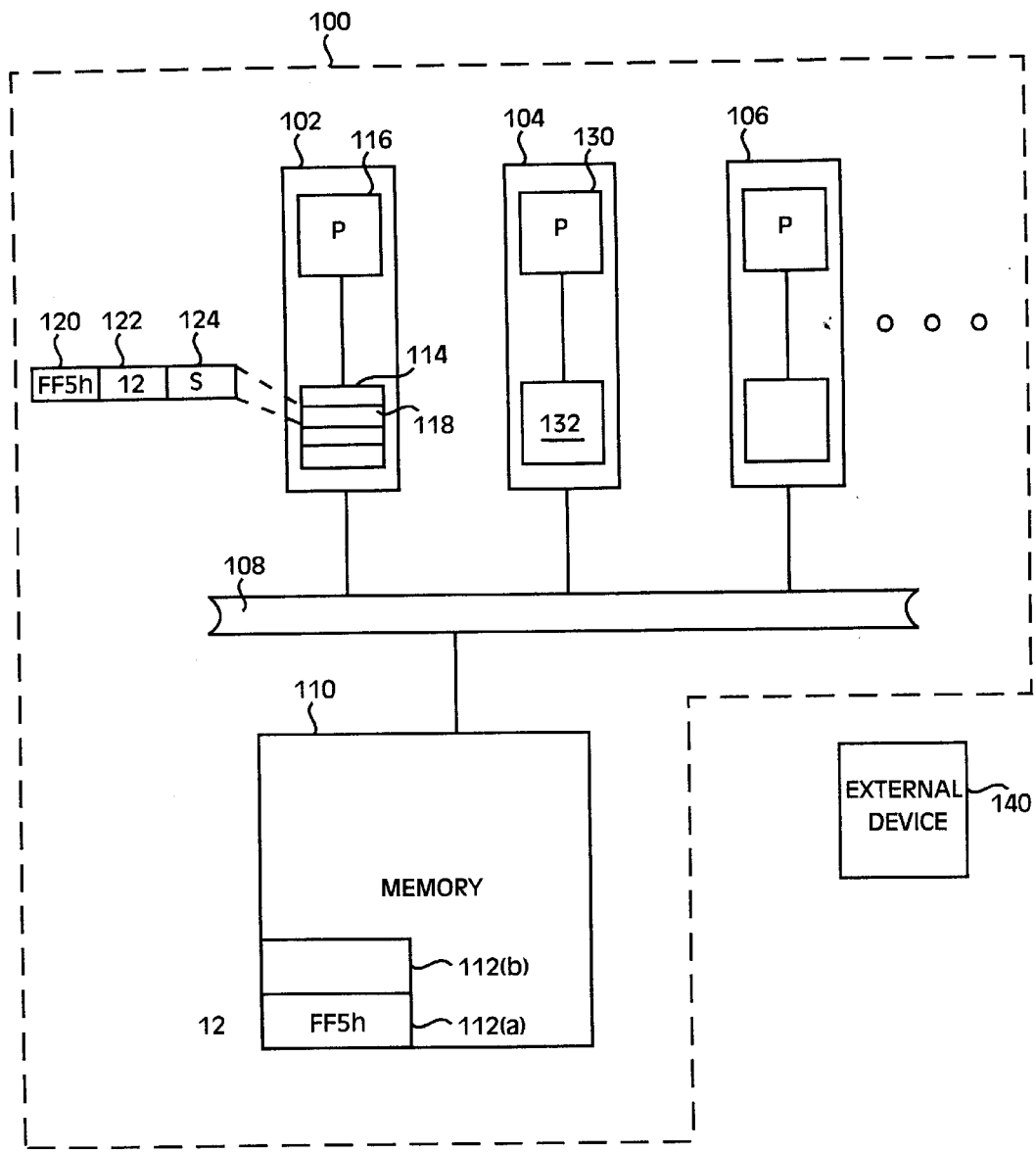
FIG. 1 shows, for discussion purposes, a computer system representing, e.g., a computer node in a more complex computer system.

There is coupled to snoop tag array 250 snooping logic 260, representing the logic, in hardware and/or software, employed to monitor memory access requests on common bus 108 on FIG. 1. In one embodiment, snooping logic 260 is substantially similar to the conventional snooping logic employed in each of processing nodes 102, 104, and 106 for permitting those processing nodes to monitor memory access requests on common bus 108.

Within each tag, e.g., tag 253, there is a state field 252(a) and an address field 252(b). In one embodiment, state field 252(a) may store one of three states although additional states may be employed if desired. These three states are: I(invalid), S(shared), and E(exclusive and potentially modified). Address field 252(b) stores the address of the memory block cached, thereby permitting coherence transformer 200 to track which memory block has been cached by an external device. The I, S, E states are employed to track which copy of a given memory block (specified by address field 252(b)) is currently cached externally.

It should be apparent to those skilled in the art from the foregoing that some type of protocol conversion may be necessary to permit devices and systems utilizing different protocols and/or operating at different speeds to share memory blocks. Protocol transformer logic 262 represents the logic, implemented in hardware and/or software, that permits coherence transformer 200 to communicate with an external device, e.g., one of external devices 202, 204, and 206. Protocol transformer logic 262 may be omitted, for example, if the external device employs the same protocol as that employed in computer node 100 or operates at the same speed. Keep in mind that the specific protocol employed to communicate with a specific external device may vary greatly depending on the specification of the protocol employed by that external device. As will be discussed in greater detail herein, it is assumed that communication for the purpose of sharing memory blocks with the external devices can be accomplished using a generalized protocol known as the X-protocol. The adaptation of the described X-protocol to a specific external device should be readily apparent to those skilled in the art given this disclosure.

Figure 4:
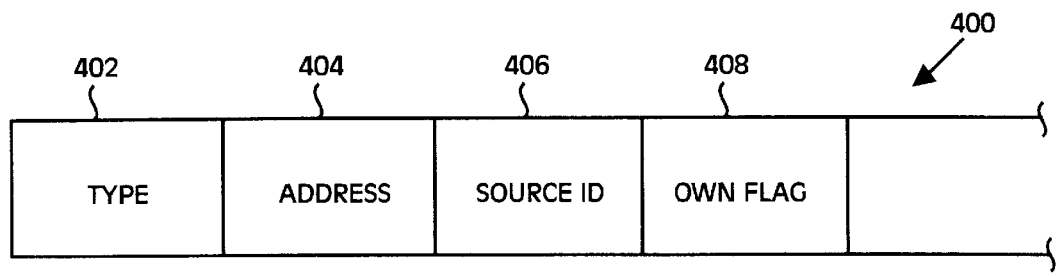
FIG. 4 shows in greater detail, in accordance with one aspect of the present invention, the format of a typical memory access request on common bus 108.

FIG. 4 shows in greater detail in accordance with one aspect of the present invention the format a memory access request 400, representing a typical memory access request output by, for example, one of the processing nodes in computer node 100 or by coherence transformer 200 on common bus 108 to request a memory block. Memory access request 400 typically includes a type field 402, an address field 404, a source ID field (SID) 406, and an own flag 408.

Type field 402 specifies the type of memory access request being issued. A requesting entity, e.g., one of the processing nodes in computer node 100, may issue a request for an exclusive copy of a memory block by issuing a request-to-own (RTO) type of memory access request. Once the exclusive copy is obtained, the requesting entity may then either read from or write to the cached copy of the memory block to cause it to be different from its counterpart in memory module 110. A requesting entity may also issue a request for a shared, read-only copy of a memory block by issuing a read-to-share (RTS) type of memory access request. Alternatively, a requesting entity may issue a request to common bus 108 to ask permission to write back to memory module 110 (via a write back or "WB" type of memory access request) an exclusive copy of a memory block it earlier cached.

Address field 404 specifies the address of the memory block requested by memory access request 400. Source ID field 406 specifies the identity of the entity that issues memory access request 400. Own flag 408 represent the flag bit that is normally reset until one of the entities, other than memory module 110, that is capable of servicing a memory access request, e.g., one of processing nodes 102–106 or coherence transformer 200, sets own flag 408. An entity coupled to common bus 108 may wish to set own flag 408 to indicate that the current memory access request should not be serviced by memory module 110, i.e., one of the entities capable of caching that memory block has done so and may potentially have a newer copy than that in memory module 110.

Figure 5:
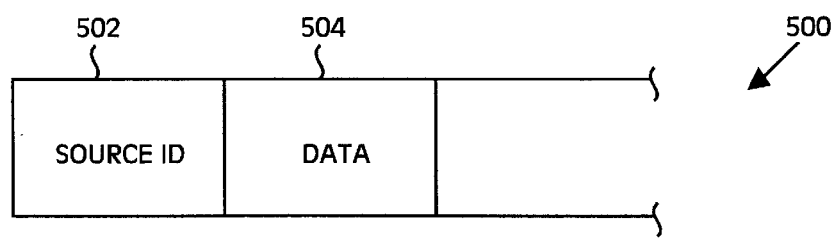
FIG. 5 shows in greater detail, in accordance with one aspect of the present invention, the format of a typical response to the request of FIG. 4.

FIG. 5 shows in greater detail in accordance with one aspect of the present invention the format of a response 500. Response 500 is typically issued by the entity responding to an earlier issued memory access request, e.g., one having the format of memory access request 400 of FIG. 4. As is shown in FIG. 5, response 500 includes a source ID (SID) field 502, representing the unique ID of the requesting entity to which the response should be sent. In one embodiment, SID field 502 is substantially similar in content to the SID data contained in source If) field 406 of FIG. 4. The use of the source ID permits coherence transformer 200 to communicate directly with common bus 108 and entitles coherence transformer 200 to rely on the mechanism of common bus 108 to forward the response, using the SID, to the appropriate final destination. Response 500 further includes a data field 504, representing the content of the requested memory block.

Referring back now to FIGS. 2 and 3, when there is a memory access request, e.g., one having a format of memory access request 400 of FIG. 4, on common bus 108, coherence transformer 200 (via coherence transformer link 220) monitors this memory access request and checks address field 404 of the memory access request against the addresses of the memory blocks cached by one of the external devices. With reference to FIG. 3, this checking is performed, in one embodiment, by comparing address field 404 against the addresses stored in address fields 252(b) of the tags within the snoop tag array 250.

If there is an address match, the state of the matched tag is then checked to ascertain whether the memory block cached by the external device is of the appropriate type to service the outstanding memory access request. This is because an external device may currently have only an invalid copy of a memory block and would therefore be incapable of servicing either a RTO or a RTS memory access request.

If the state of the matched tag indicates that the externally cached memory block is the appropriate copy for servicing the outstanding memory access request, snooping logic 260 of coherence transformer 200 may then set own flag 408 to signify that the default response should be overridden, i.e., memory module 110 should not respond to the outstanding memory access request since there may be a more current copy cached by one of the external devices.

Own flag 408 of memory access request 400, while logically associated with the memory access request, is skewed in time therefrom in one embodiment. In this manner, the own flag may arrive a few cycles later than the rest of the memory access request to allow time for entities, such as coherence transformer 200, to ascertain whether they should respond to the memory access request with a more recent copy of the requested memory block than that available in memory module 110.

Coherence transformer 200 then obtains the appropriate copy of the requested memory block from the external device, using its knowledge of which external device currently holds the most recent copy. Coherence transformer 200 then formulates a response 500 to return the appropriate copy of the requested memory block to common bus 108 to be forwarded to the requesting entity, i.e., one identified by the source ID in the issued memory access request.

As mentioned earlier, whenever memory block 112 is cached by one of the external devices, a tag is created for that memory block in snoop tag array 250 of coherence transformer 200 to keep track of which memory block of computer node 100 has been cached by the external devices and (in state field 252(a) of the matching tag) which type of copy was actually cached. FIG. 6 shows, in one embodiment of the present invention, the various available states that may be stored in state field 252(a) of the tags of snoop tag array 250. In FIG. 6, three possible states are shown: I, S, and E, signifying respectively that an invalid, shared, and exclusive copy of a memory block is being cached by an external device.

When the state in the tag is I, the external devices do not have a copy of the requested memory block even if there is a match between the incoming address and one of the addresses stored in snoop tag array 250. If the state in the matching tag is S, at least one of the external devices owns a shared, read-only copy of the requested memory block. If the state in the matching tag is E, one of the external devices owns an exclusive copy of the requested memory block, which it can use to respond to, for example, a RTO memory access request. Further, the external device owning the exclusive copy can unilaterally modify this copy without having to inform other bus entities attached to common bus 108.

The operation of coherence transformer 200 may be more clearly understood with reference to FIGS. 7 and 8. FIG. 7 illustrates, in one embodiment of the present invention, selected transactions performed by coherence transformer 200 in response to memory access requests on common bus 108.

RTO Request on Bus

Referring now to FIG. 7, when a RTO memory access request is issued by one of the bus entities on common bus 108 (as the term is used hereinafter, a "bus entity" refers to any entity such as a processing unit or any other device that is coupled to common bus 108 for sharing a memory block), this RTO memory access request is forwarded to all bus entities, including coherence transformer 200. Coherence transformer 200 then ascertains whether the address of the requested memory block matches one of the addresses stored in snoop tag array 250 of coherence transformer 200.

If there is an address match, the current state of the matching tag is then ascertained to determine whether the copy cached by one of the external devices is of the appropriate type for responding to the memory access request on common bus 108. If the memory access request is a request for an exclusive copy of a memory block (a RTO) or a request for a shared copy of a memory block (a RTS), and the current state of the matching tag is I (invalid), coherence transformer 200 ignores the RTO memory access request since the external device either never cached the requested memory block or the memory block that was once cached is now an invalid copy.

If the memory access request on common bus 108 is a RTO (the first RTO of this transaction) and the current tag is S, coherence transformer 200 needs to invalidate the shared external copy or copies currently cached by one or more of the external devices. This invalidation is illustrated in FIG. 7 by the XINV command, which is a X-protocol invalid command directed at every external device currently having a shared external copy. Following the invalidation, the new state of the memory block in the external device is invalid (New State=I).

Upon confirmation that the external device has invalidated its shared copy of the requested memory block (via the X-protocol command XINV_ack), coherence transformer 200 then downgrades the state of the matching tag to invalid (New State=I) to reflect the fact that there is no longer a valid external copy. Coherence transformer 200 then obtains a copy of this requested memory block from computer node 100 and invalidates all internal copies cached by bus entities within computer node 100. Both these actions are accomplished when coherence transformer 200 issues a RTO command (the second RTO of this transaction) to common bus 108 and receives the requested data (via the RTO_data response to the second RTO). The copy of the requested memory block is then sent to common bus 108 to be forwarded to the entity that originally issues the RTO memory access request (via the RTO_data response to the first RTO).

Note that the use of the XINV command advantageously invalidates all shared copies of the requested memory block cached by the external device(s). Further, the use of the RTO request by coherence transformer 200 to common bus 108 advantageously ensures that all shared copies within computer node 100 are invalidated and obtains the required memory block copy to forward to the requesting entity.

The current state of the matching tag may be an E when a RTO memory access request appears on common bus 108. The E state signifies that an external device currently caches an exclusive (and potentially modified) copy of the memory block being requested. In this case, coherence transformer 200 may obtain the exclusive (and potentially modified) copy of the requested memory block from the external device and return that copy to the entity that originally issues the RTO request on common bus 108.

As shown in FIG. 7, coherence transformer 200 may issue a RTO-like transaction using the X-protocol XRTO transaction to request the exclusive copy of the memory block, which is currently being cached by one of the external devices. If there are multiple external devices coupled to coherence transformer 200, there may be provided with coherence transformer 200 conventional logic, in one embodiment, to allow coherence transformer 200 to determine which external device currently holds the desired exclusive copy of the requested memory block.

The requested copy of the memory block is then returned to coherence transformer 200 from the external device that currently holds it (using the XRTO_data command, which is analogous to the aforementioned RTO_data except accomplished using the X-protocol). Further, the external copy that was previous cached by the external device is downgraded to an invalid copy. This downgrade is tracked in the matching tag in snoop tag array 250, thereby changing the state to I (New State=I). After coherence transformer 200 receives the exclusive copy of the requested memory block from the external device that previously cached it, coherence transformer 200 formulates a response to the original RTO, using e.g., using an RTO_data response in a format similar to that shown in FIG. 5, to furnish the requested exclusive copy of the memory block to common bus 108 to be forwarded to the entity that originally issued the RTO memory access request.

RTS Request on Bus

If the memory access request on common bus 108 represents a request for a shared, read-only copy of a memory block, i.e., a RTS (the first RTS) and the current state of the matching tag is I (invalid), coherence transformer 200 will ignore the outstanding RTS memory access request even if there is a match between the incoming address and one of the addresses stored in the tags of snoop tag array 250. On the other hand, if the current state of the matching tag is S (i.e., one or more of the external devices currently cache shared, read-only copies of the requested memory block), coherence transformer 200 may, in one embodiment, obtain the shared, read-only copy of the requested memory block from computer node 100 itself, e.g., by issuing a RTS request to common bus 108 (the second RTS request). After coherence transformer 200 receives the shared, read-only copy from computer node 100 (via the RTS_data response to the second RTS), it then forwards the copy to common bus 108 to be forwarded to the bus entity that originally issues the RTS command (via the RTS_data response to the first RTS).

If the memory access request on common bus 108 is a RTS and the current state of the matching tag is E, coherence transformer 200 may obtain the copy of the memory block that is currently exclusively owned by one of the external devices. Further, coherence transformer 200 may downgrade that external copy to a shared copy, and return the data to common bus 108 to be forwarded to the entity that originally issued the RTS memory access request. To accomplish the foregoing, coherence transformer 200 may issue a X-protocol RTS-like transaction (XRTS) to the external device that currently exclusively owns the requested memory block. That external device will return the copy it previously owns as an exclusive copy to coherence transformer 200 (XRTS_data) and also downgrade the external copy from an exclusive copy to a shared copy (New State=S in the matching tag). When coherence transformer 200 receives the copy of the memory block from the external device, it can forward that copy to common bus 108 (via the RTS_data command) to be forwarded to the entity that originally issue the RTS memory access request.

WB Request on Bus

If the memory access request on common bus 108 represents a write back (WB) request, i.e., signifying that a bus entity coupled to common bus 108, other than coherence transformer 200, wishes to write back the exclusive copy of the memory block it currently owns. In this situation, the response of coherence transformer 200 depends on the state of the copy of the memory block currently cached by the external device. Generally, the entity that issues the write back memory access request owns the exclusive copy of that memory block, and any copy that may have been cached by an external device earlier must be invalid by the time the write back memory access request is asserted by its owner on common bus 108. Consequently, the current state in the matching tag, if any, should be I (invalid), in which case coherence transformer 200 does nothing and ignores the outstanding write back transaction on common bus 108.

If, for some reason, the current state of a matching tag is S or E, an error condition would be declared since there cannot be another shared or exclusive copy in the system if the write back entity already has an exclusive copy of the memory block. The resolution of this error condition is conventional and may include, for example, flagging the error and performing a software and/or a hardware reset of the system.

Coherence transformer 200 not only interacts with the processing nodes within computer node 100 to respond to memory access requests issued by those processing nodes, it also interacts with the external devices, e.g., one of external devices 202, 204, and 206, in order to service memory access requests pertaining to memory blocks having local physical addresses within computer node 100. FIG. 8 illustrates, in accordance with one embodiment, selected transactions performed by coherence transformer 200 in response to memory access requests from one of the external devices.

In FIG. 8, the memory access requests are issued by one of the external devices, e.g., one of devices 202, 204, or 206, to coherence transformer 200. If another external device currently caches the required copy of the requested memory block, this memory access request may be handled by logic circuitry provided with coherence transformer 200 without requiring the attention of coherence transformer 200 itself.

On the other hand, if another external device does not have the valid copy of the requested memory block to service the external memory access request, coherence transformer 200 then causes a memory access request to appear on common bus 108, using a protocol appropriate to computer node 100, so that coherence transformer 200 can obtain the required copy of the requested memory block on behalf of the requesting external device. Further, since a copy of the memory block is now cached by an external device, this memory block is preferably tracked in a tag in snoop tag array 250 of coherence transformer 200.

In one embodiment, the coherence transformer always asserts the own flag on bus transactions for blocks that are externally cached as exclusive or may be externally cached as shared. This advantageously allows the coherence transformer to take more time to correctly handle such requests.

XRTO Request

Referring now to FIG. 8, when an external device issues a memory access request to obtain an exclusive copy of a memory block having a local physical address within computer within computer node 100, e.g., memory block 112(*a*), coherance transformer 200 first determines whether the address of the requested memory block matches one of the addresses stored in snoop tag array 250 of coherence transformer 200. If there is a match, the current state of the tag that matches the incoming address, i.e., the matching tag, is then ascertained to determine whether an external device, e.g., any of the external devices that couple to coherence transformer 200, has cached a copy of the requested memory block.

If the current state of the matching tag is I (invalid), coherence transformer 200 proceeds to obtain the requested memory block from common bus 108. This is because a current state invalid (I) indicates that none of the external devices currently caches a valid (whether a shared, read-only copy or an exclusive copy) of the requested memory block. Further, since the requested memory block will be cached by the requesting external device, e.g., I/O device 202, after the current memory access request is serviced, this requested memory block needs to be tracked within snoop tag array 250 of coherence transformer 200 so that the next memory access request pertaining to this memory block can be serviced by coherence transformer 200 on behalf of the external device, e.g., I/O device 202, which then has an exclusive (and potentially modified) copy.

To track the cached memory block in snoop tag array 250, a tag within snoop tag array 250 may need to be allocated to store the address of the cached memory block, along with the state of the copy (e.g., E, S, or I). If there is an unused tag in snoop tag array 250, e.g., one of the tags has a current state invalid or is simply unused, this unused tag may be employed for tracking the newly cached memory block. FIG. 8 shows this situation wherein the old tag has state I, and no action is required to make the tag available for use.

On the other hand, when there are no unused tags in snoop tag array 250, the invention may unallocate a tag so that it may be utilized to track the newly cached memory block. A currently valid tag may be unallocated by writing back the corresponding cached external copy of the memory block to memory module 110. The selection of an appropriate externally cached memory block to be written back can be performed using any conventional techniques, e.g., first in first out (FIFO) or least recently used (LRU).

If the tag to be unallocated currently has a state S, i.e., an external device currently caches a shared, read-only of the memory block corresponding to the tag to be unallocated, coherence transformer 200 merely instructs this external device to invalidate its shared, read-only copy (via the X-protocol XINV command). Upon confirmation that the external device has invalidated its shared, read-only copy as requested (via the X-protocol XINV_ack command), the unallocated tag, which now has a state I, may then be employed to track the newly cached memory block.

On the other hand, if the tag to be unallocated currently has a state E, i.e., an external device currently caches an exclusive (and potentially modified) copy of the memory block corresponding to the tag to be unallocated, coherence transformer 200 obtains a copy of this externally cached exclusive copy and further downgrades this external copy from an exclusive to an invalid copy (via the X-protocol XRTO). Upon receipt of the exclusive (and potentially modified) copy of the memory block and confirmation that the external device has indeed invalidated its external exclusive copy as requested (via the XRTO_data command), coherence transformer 200 then performs a write back (by issuing a WB request, followed by the WB_data command to common bus 108). Thereafter, the unallocated tag, which now has a state I, may then be employed to track the newly cached memory block.

Referring back to the case in FIG. 8 where there exists a XRTO memory access request from an external device and the current state of the matching tag is I or there is no tag that matches, coherence transformer 200 acts as another bus entity coupled to common bus 108, i.e., it communicates with common bus 108 using a protocol appropriate to computer node 100 to issue a memory access request for an exclusive copy of the requested memory block. In other words, coherence transformer simply issues a RTO memory access request to common bus 108.

The presence of the request-to-own (RTO) memory access request on common bus 108 causes one of the bus entities, e.g., one of processing nodes 102, 104, and 106, or memory module 110, to respond with the latest copy of the requested memory block (RTO_data transaction in FIG. 8). After coherence transformer 200 receives the exclusive copy of the requested memory block from common bus 108, it then forwards this exclusive copy to the requesting external device using a protocol that is appropriate for communicating with the requesting external device (generalized as the X-protocol XRTO_data command herein). Further, the new state of the tag that tracks this requested memory block is now upgraded to an E state, signifying that an external device is currently caching an exclusive (and potentially modified) copy of this memory block.

If one of the external devices, e.g., I/O device 202, issues a read-to-own memory access request (using the X-protocol XRTO) for a given memory block and a shared, read-only copy of that memory block has already been cached by a sister external device, e.g., coherent domain device 204, there would already be a tag in snoop tag array 250 for tracking this memory block. However, the state of such tag will reflect a S copy since the sister external device only has a shared read-only copy. In this case, there is no need to allocate a new tag to track the requested memory block. Coherence transformer must still invalidate all other shared copies of this memory block in computer node 100 and on the sister external devices, as well as upgrade the state of the matching tag to an E state.

To invalidate the shared copies at the sister external devices, coherence transformer 200 may issue an invalidate command (XINV) to those sister external devices and wait for the acknowledged message (XINV_ack). To invalidate shared, read-only copies of the requested memory block on the bus entities in computer node 100, coherence transformer 200 issues a request-to-own (RTO) memory access request to common bus 108. This RTO command both obtains a copy of the requested memory block (RTO_data transaction) and invalidates the shared, read-only copies cached by the bus entities in computer node 100.

After coherence transformer 200 receives the copy of the requested memory block from common bus 108 (via the RTO_data transaction), coherence transformer 200 may then forward this copy to the requesting external device to service the XRTO memory access request (XRTO_data transaction). Further, the state associated with the matching tag in snoop tag array 250 may be upgraded from a S (shared) state to an E (exclusive) state.

If the memory access request received by coherence transformer 200 is a request for an exclusive memory block (XRTO) from an external device and a sister external device is currently caching the exclusive copy of that memory block, logic circuitry provided with coherence transformer 200 preferably obtains the requested memory block from the sister external device to satisfy the XRTO request without requiring the attention of coherence transformer 200 itself As a general rule, if there are more than one external devices, they may, in one embodiment, resolve memory access requests by passing copies of memory blocks among themselves before asking for it from common bus 108 (via coherence transformer 200). On the other hand, if the XRTO memory access request for a memory block comes from an external device that already is currently caching the exclusive copy of the same requested memory block, an error condition exists as shown in FIG. 8. The error condition may be handle using a variety of conventional techniques, e.g., flag the error and/or perform a software or hardware reset. Further, in one embodiment, the coherence transformer could handle XRTO's to externally cache blocks by forwarding requests to sibling devices.

XRTS Request

When an external device issues a memory access request to obtain a shared, read-only copy of a memory block having a local physical address within computer node 100 such as memory block 112(*a*) (via an XRTS command), coherence transformer 200 first determines whether the address of the requested memory block matches one of the addresses stored in snoop tag array 250 of coherence transformer 200. If there is a match, the matching tag is then ascertained to determine whether an external device, e.g., any of the external devices that couple to coherence transformer 200, has cached a copy of the requested memory block.

If the current state of the matching tag is I (invalid), coherence transformer 200 proceeds to obtain the requested memory block from common bus 108. This is because a current state invalid (I) indicates that none of the external devices currently caches a valid (whether a shared, read-only copy or an exclusive copy) of the requested memory block. Further, since the requested memory block will be cached by the requesting external device, e.g., I/O device 202, after the current memory access request is serviced, this requested memory block needs to be tracked within snoop tag array 250 of coherence transformer 200. A tag within snoop tag array 250 may need to be allocated to store the address of the cached memory block, along with the state of the copy (i.e., S). If there is an unused tag in snoop tag array 250, e.g., one of the tag has a current state invalid or is simply unused, this unused tag may be employed for tracking the newly cached memory block. FIG. 8 shows this situation wherein the old tag has a state I, and no action is required to make the tag available for use.

On the other hand, when there are no unused tags in snoop tag array 250, the method preferably unallocates a tag so that it may be utilized to track the newly cached memory block. The actions required for unallocating a currently valid tag is discussed earlier in connection with the XRTO transaction.

Referring back to the case in FIG. 8 where there exists a XRTS memory access request from an external device and the current state of the matching tag is I or there is no tag that matches, coherence transformer 200 may act simply as another bus entity coupled to common bus 108, i.e., it communicates with common bus 108 using a protocol appropriate to computer node 100 to issue a memory access request for a shared, read-only copy of the requested memory block. In other words, coherence transformer simply issues a RTS memory access request to common bus 108.

The presence of the request-to-share (RTS) memory access request on common bus 108 causes one of the bus entities, e.g., one of processing nodes 102, 104, and 106, or memory module 110, to respond with the shared copy of the requested memory block (RTS_data transaction in FIG. 8). After coherence transformer 200 receives the shared, read-only copy of the requested memory block from common bus 108, it then forwards this shared, read-only copy to the requesting external device using a protocol that is appropriate for communicating with the requesting external device (generalized as the X-protocol XRTS_data command herein). Further, the new state of the tag that tracks this requested memory block is now upgraded to a S state, signifying that an external device is currently caching a shared, read-only copy of this memory block.

If one of the external devices, e.g., I/O device 202, issues a read-to-share memory access request (using the X-protocol XRTS) for a given memory block and a shared, read-only copy of that memory block has already been cached by a sister external device, e.g., coherent domain device 204, there would already be a tag in snoop tag array 250 for tracking this memory block. Further, the state of such tag will reflect a S copy. In this case, there is no need to allocate a new tag to track the requested memory block.

In one embodiment, logic circuitry associated with coherence transformer 200 may obtain the shared, read-only copy of the requested memory block from the sister external device to satisfy the outstanding XRTO request. In this embodiment, no action on common bus 108 is required. In another embodiment, coherence transformer 200 may obtain the requested shared, read-only copy of the requested memory block from the bus entities in computer node 100 by issuing, as shown in FIG. 8, a request-to-share (RTS) memory access request to common bus 108.

After coherence transformer 200 receives the shared, read-only copy of the requested memory block from common bus 108 (RTS_data transaction), coherence transformer 200 may then forward this copy to the requesting external device to service the XRTS memory access request (XRTS_data transaction). Further, the state associated with the matching tag in snoop tag array 250 is maintained at a S (shared) state.

If the memory access request received by coherence transformer 200 is a request for a shared, read-only copy of a memory block (XRTS) from an external device and a sister external device is currently caching the exclusive copy of that memory block, logic circuitry provided with coherence transformer 200 preferably obtains the requested memory block from the sister external device (and downgrades the previously existing exclusive copy) to satisfy the XRTS request without requiring the attention of coherence transformer 200 itself On the other hand, if the XRTS memory access request comes from an external device that already is currently caching the exclusive copy of the requested memory block, an error condition exists as shown in FIG. 8. The error condition may be handle using a variety of conventional techniques, e.g., flag the error and/or perform a software or hardware reset.

XWB Request

If the memory access request received by coherence transformer 200 is a write back transaction (X-protocol XWB transaction), i.e., an external device wishes to write back the exclusive copy of a memory block it currently owns, the actions of coherence transformer 200 depends on the state of the copy of the memory block currently cached by the external device. Generally, the external device that issues the write back transaction owns the exclusive copy of that memory block, and the current state of the matching tag in snoop tag array 250 should show an E (exclusive) state. Consequently, if the current state in the matching tag is I (invalid) or S (shared, read_only), an error condition exists as shown in FIG. 8. Again, this error condition may be handle using a variety of conventional techniques, including flagging the error and/or performing a software or hardware reset.

If the current state of the matching tag in snoop tag array 250 is an E (exclusive) state, coherence transformer 200 proceeds to receive the data to be written back (via the X-protocol XWB_data command) and issues a WB memory access request to common bus 108, to be followed up by the data (WB_data). Further, the external copy of the requested memory block is downgraded accordingly from an exclusive copy to an invalid copy (New State=I).

To further clarify the details regarding the generalized X-protocol, which is employed by coherence protocol 200 in communicating with each external device, Tables 1 and 2 illustrate selected X-protocol requests and X-protocol responses. It should be borne in mind that Tables 1 and 2 are shown for illustration purposes only and other requests and response mentioned may be provided depending on needs. As mentioned earlier, the adaptation of the disclosed generalized X-protocol transactions to work with a specific external coherence domain will depend greatly on the specification of the protocol employed by the specific external device and is generally within the skills of one skilled in the art.

In Table 1, the X-protocol requests, the actions represented by the requests, and possible responses thereto are shown. In Table 2, the X-protocol responses and the actions represented by the responses are shown. Table 2 further specifies whether a given response will be accompanied by data.

TABLE 1

| REQUEST | ACTION | POSSIBLE RESPONSES |
|---|---|---|
| XRTO | Get exclusive copy of memory block | XRTO_data, XRTO_nack |
| XRTS | Get shared, read-only copy of memory block | XRTS_data, XRTS_nack |
| XINV | Invalidate copy of memory block | XINV_ack |
| XWB | Request to write back currently cached exclusive copy of memory block | XWB_ack, XWB_nack |

TABLE 2

| RESPONSES | ACTION | DATA? |
|---|---|---|
| XRTO_data | Reply with exclusive copy of memory block | Y |
| XRTO_nack | Not acknowledged, retry XRTO progenitor | N |
| XRTS_data | Reply with shared copy of memory block | Y |
| XRTS_nack | Not acknowledged, retry XRTS progenitor | N |
| XINV_ack | acknowledged | N |
| XWB_ack | acknowledged, permitting XWB_data | N |
| XWB_data | write back with exclusive copy of memory block | Y |

Advantageously, the use of a coherence transformer and the tightly-coupled request-response transactions permit external devices, which may employ protocols different from the protocol on common bus 108 of computer node 100 to share memory blocks which have local physical addresses within computer node 100. In this manner, coherence transformer 200 insulates computer node 100 and the external devices from one another, allowing them to share memory blocks despite their difference in protocols. Further, the explicit handshaking provided by the tightly coupled request-response pairs makes this sharing possible even if the external devices may each be operating at a different operating speed from that on common bus 108.

In a system in which coherence transformer 200 facilitates such memory block sharing, there is essentially no effect on performance within computer node 100 when an external device does not cache a memory block. When an external device caches fewer memory blocks than there are tags in snoop tag array 250 of coherence transformer 200, the effect on the overall system performance is fairly minimal. This is because when there are fewer externally-cached memory blocks than there are available tags in snoop tag array 250, no additional transactions employing common bus 108, i.e., write backs to unallocate tags, are required to service a memory access request.

The latency in responding to outstanding memory access requests on common bus 108 is due in part from the delay required for coherence transformer 200 to examine tags in snoop tag array 250 to determine whether coherence transformer 200 should intervene to service a memory access request on common bus 108. In view of this fact, the overall system latency can be kept to a minimum by choosing the appropriate number of tags in snoop tag array 250 in view of the number of memory blocks expected to be cached at any given time by the external devices.

Even when there are more memory blocks cached by the external devices than there are tags in snoop tag array 250 of coherence transformer 200, the system still can advantageously service the memory access requests by performing write backs of externally cached memory blocks (to unallocate tags to facilitate tracking of externally cached memory blocks). Although some performance penalty is involved, the overall goal of facilitating the sharing of memory blocks between computer node 100 and the external devices, each of which may employ a different protocol and operate at a different speed, is still achieved.

Note that neither the external devices nor computer node 100 need to accommodate tags to participate in memory sharing. Only coherence transformer 200 needs to employ and track tags to avoid coherence problems. Consequently, this feature of coherence transformer 200 advantageously permits a given computer node 100 to work with a wide range of existing external devices to facilitate memory sharing without requiring any modification to the external devices or to computer node 100.

While this invention has been described in terms of several preferred embodiments, there are alterations, permutations, and equivalents which fall within the scope of this invention. It should also be noted that there are many alternative ways of implementing the methods and apparatuses of the present invention. By way of example, some systems may crate an illusion of a common bus without requiring a physical bus (e.g., via a set of broadcast wires). The KSR-1 from Kendall Square Research of Massachusetts is one such example. The present invention applies equally well to these and other analogous systems. It is therefore intended that the following appended claims be interpreted as including all such alterations, permutations, and equivalents as fall within the true spirit and scope of the present invention.

What is claimed is:

1. In a computer system having a computer node which has a common bus, a method for enabling an external device that is external to said computer node to share memory blocks having local physical addresses in a memory module at said computer node irrespective whether said external device and said common bus both employ a common protocol and irrespective whether said external device and said common bus both operate at the same speed, said method comprising:

monitoring memory access requests on said common bus through a coherence transformer; and obtaining, through the coherence transformer coupled to said common bus, a first copy of a first memory block having a local physical address in said memory module on behalf of said external device, said obtaining including, receiving, using said coherence transformer, a first memory access request for said first memory block from said external device;

acquiring, using said coherence transformer, said first copy of said first memory block from said common bus;

tracking, using a tag of a snoop tag array that is part of said coherence transformer, a state and an address of said first copy of said first memory block at said external device, said state includes one of an exclusive, a shared, and an invalid states; and sending said first copy of said first memory block from said coherence transformer to said external device.

2. The method of claim 1 wherein said step of obtaining said first copy of said first memory block further comprising the step of unallocating said tag in said snoop tag array prior to said tracking step.

3. The method of claim 2 wherein said step of unallocating said tag comprises:

retrieving, using said coherence transformer, a first copy of a second memory block from said external device, said second memory block being different from said first memory block;

invalidating, using said coherence transformer, a copy of said second memory block at said external device; and writing, using said coherence transformer, said first copy of said second memory block to said memory module via said common bus, thereby unallocating said tag.

4. The method of claim 1 further comprising the step of responding, through said coherence transformer, to a second memory access request on said common bus on behalf of said external device, comprising:

wherein said monitoring memory access requests on said common bus is configured to determine whether a second memory access request of said memory access requests on said common bus pertains to any one of memory blocks tracked in tags of said snoop tag array; and responding to said second memory access request, using said coherence transformer, if said second memory access request pertains to a second memory block, said second memory block representing said one of memory blocks tracked in said tags of said snoop tag array.

5. The method of claim 4 wherein said coherence transformer responds to said second memory access request only if a tag tracking said second memory block in said snoop tag array indicates that a first copy of said second memory block is valid at said external device.

6. The method of claim 5 wherein said second memory access request is a request for an exclusive copy and said tag tracking said second memory block indicates that said first copy of said second memory block at said external device is an exclusive copy of said second memory block, said step of responding to said second memory access request comprises:

obtaining, using said coherence transformer, a second copy of said second memory block from said first copy of said second memory block at said external device;

invalidating said first copy of said second memory block at said external device; and forwarding said second copy of said second memory block from said coherence transformer to said common bus to enable a progenitor of said second memory access request to obtain said second copy of said second memory block.

7. The method of claim 5 wherein said second memory access request is a request for an exclusive copy and said tag tracking said second memory block indicates that said first copy of said second memory block at said external device is a shared copy of said second memory block, said step of responding to said memory access request comprises:

invalidating said first copy of said second memory block at said external device;

obtaining, using said coherence transformer, a second copy of said second memory block from said computer node via said common bus;

invalidating, using said coherence transformer, any valid copy of said second memory block in said computer node; and forwarding said second copy of said second memory block from said coherence transformer to said common bus to enable a progenitor of said second memory access request to obtain said second copy of said second memory block.

8. The method of claim 5 wherein said second memory access request is a request for a shared copy and said tag tracking said second memory block indicates that said first copy of said second memory block at said external device is a shared copy of said second memory block, said step of responding to said memory access request comprises:

obtaining, using said coherence transformer, a second copy of said second memory block from said computer node via said common bus; and forwarding said second copy of said second memory block from said coherence transformer to said common bus to enable a progenitor of said second memory access request to obtain said second copy of said second memory block.

9. The method of claim 5 wherein said second memory access request is a request for a shared copy and said tag tracking said second memory block indicates that said first copy of said second memory block at said external device is an exclusive copy of said second memory block, said step of responding to said memory access request comprises:

obtaining, using said coherence transformer, a second copy of said second memory block from said external device; changing said tag tracking said second memory block to indicate that said first copy of said second memory block at said external device is a shared copy of said second memory block; and forwarding said second copy of said second memory block from said coherence transformer to said common bus to enable a progenitor of said second memory access request to obtain said second copy of said second memory block.

10. A method for sharing memory blocks having local physical addresses in a memory module at a computer node between said computer node and an external device in a computer system, said sharing being facilitated through a coherence transformer coupled between said external device and a common bus of said computer node, said coherence transformer having snooping logic for monitoring memory access requests on said common bus, said coherence transformer further having a snoop tag array for tracking all memory blocks cached by said external device, comprising:

receiving, using said coherence transformer, a first memory access request pertaining to a first memory block of said memory blocks, said first memory access request being issued by said external device; and servicing, using said coherence transformer, said first memory access request by obtaining on behalf of said external device said first memory block from said common bus of said computer node, thereby insulating said computer node from any protocol difference between a first protocol employed by said external device and a second protocol employed on said common bus.

11. The method of claim 10 wherein said step of servicing said first memory access request comprises:

requesting, using said coherence transformer, a first copy of said first memory block from said common bus of said computer node;

tracking said first memory block, including an address of said first memory block and a state of said first copy of said first memory block at said external device, in a first tag of said snoop tag array, said first tag storing a state that includes one of an exclusive state, a shared state, and an invalid state; and forwarding said first copy of said first memory block from said coherence transformer to said external device.

12. The method of claim 11 wherein said step of tracking said first memory block further comprises:

if there exists an unused tag in said snoop tag array, employing said unused tag as said first tag for tracking said first memory block; and if there is no unused tag in said snoop tag array, performing a forcible write back of a previously cached memory block from said external device to said memory module at said computer node to unallocate a second tag, thereby enabling said second tag to be used as said first tag for tracking said first memory block.

13. The method of claim 12 where as said step of performing said forcible write back further comprises:

obtaining, using said coherence transformer, a copy of said previously cached memory block from said external device;

invalidating said copy of said previously cached memory block at said external device;

writing, using said coherence transformer, said copy of said previously cached memory block from said coherence transformer to said memory module via said common bus; and changing a state of said second tag to an invalid state, thereby unallocating said second tag.

14. The method of claim 10 further comprising the steps of:

receiving, using said coherence transformer, a second memory access request on said common bus pertaining to a second memory block, a valid copy of said second memory block being cached by said external device and tracked in said snoop tag array; and servicing, using said coherence transformer, said second memory access request by obtaining on behalf of a progenitor of said second memory access request said second memory block, thereby insulating said computer node from said any protocol difference between said first protocol employed by said external device and said second protocol employed on said common bus.

15. The method of claim 14 wherein said coherence transformer services said second memory access request by intervening to prevent said memory module from responding to said second memory access request.

16. The method of claim 15 wherein said second memory access request represents a request for an exclusive copy of said second memory block, said snoop tag array, after said second memory access request is serviced, does not continue to track said second memory block.

17. An apparatus for facilitating the sharing of memory blocks between a computer node and an external device, said memory blocks having local physical addresses at said computer node, comprising:

snooping logic configured to be coupled with a common bus of said computer node, said snooping logic being configured to monitor, when coupled to said common bus, memory access requests initiated by processing nodes of said computer node on said common bus;

a snoop tag array coupled to said snooping logic, said snoop tag array having tags for tracking all copies of a first plurality of memory blocks of said memory blocks that are cached by said external device; and protocol transformer logic coupled to said snooping logic for enabling said apparatus, when coupled to said external device, to communicate with said external device using a protocol suitable for communicating with said external devices;

wherein said snooping logic furthers includes logic for ascertaining whether a first memory access request on said common bus pertains to a first memory block tracked by said snoop tag array.

18. The apparatus of claim 17 further including logic for responding to said first memory access request, on behalf of said external device, if said first memory access request pertains to said first memory block tracked by said snoop tag array.

19. The apparatus of claim 17 wherein each tag of said tags in said snoop tag array tracks both an address of a memory block and a state of a copy of said memory block at said external device, said state includes one of an exclusive state, a shared state, and an invalid state.

20. The apparatus of claim 17 wherein said protocol transformer logic further includes logic for servicing a first memory access request from said external device, said first memory access pertaining to one of said memory blocks.

21. The apparatus of claim 20 further including logic for unallocating a first tag of said snoop array to enable said one of said memory blocks to be tracked in said snoop tag array, said first tag being employed to track another one of said memory block prior to being unallocated.

22. A computer system having a computer node and at least one external device, said computer node having memory blocks with local physical addresses at said computer node, said external device and said computer node capable of sharing said memory blocks, comprising:

snooping logic configured for coupling with a common bus of said computer node, said snooping logic being configured to monitor, when coupled to said common bus, memory access requests on said common bus;

a snoop tag array coupled to said snooping logic, said snoop tag array having tags for tracking all copies of a first plurality of memory blocks of said memory blocks cached by said external device; and protocol transformer logic coupled to said snooping logic for enabling said apparatus, when coupled to said external device, to communicate with said external device using a protocol suitable for communicating with said external device wherein each tag of said tags in said snoop tag array tracks both an address of a memory block and a state of a copy of said memory block at said external device, said state includes one of an exclusive state, a shared state, and an invalid state.

23. The computer system of claim 22 wherein said snooping logic further includes logic for ascertaining whether a first memory access request on said common bus pertains to a first memory block tracked by said snoop tag array.

24. The computer system of claim 23 further including logic for responding to said first memory access request, on behalf of said external device, if said first memory access request pertains to said first memory block tracked by said snoop tag array.

25. The computer system of claim 22 wherein said protocol transformer logic further includes logic for servicing a first memory access request from said external device, said first memory access pertaining to one of said memory blocks.

26. The computer system of claim 25 further including logic for unallocating a first tag of said snoop tag array to enable said one of said memory blocks to be tracked in said snoop tag array, said first tag being employed to track another one of said memory block prior to being unallocated.

* * * * *

UNITED STATES PATENT AND TRADEMARK OFFICE
CERTIFICATE OF CORRECTION

PATENT NO. : 5,860,109
DATED : January 12, 1999
INVENTOR(S) : Hagersten et al.

It is certified that error appears in the above-identified patent and that said Letters Patent is hereby corrected as shown below:

Column 14, Line 1 and 2

Change "within computer within computer" to -- within computer --

Signed and Sealed this

Tenth Day of August, 1999

Attest:

Q. TODD DICKINSON

Attesting Officer

Acting Commissioner of Patents and Trademarks